United States Patent [19]

Ikarimoto

[11] 4,033,421
[45] July 5, 1977

[54] STAIRWAY-CLIMBING CART

[75] Inventor: Yasuaki Ikarimoto, Sendai, Japan

[73] Assignee: Sunwa Sharyo Mfg. Co., Ltd., Tokyo, Japan

[22] Filed: Nov. 20, 1975

[21] Appl. No.: 633,915

[30] Foreign Application Priority Data

Nov. 26, 1974 Japan ............... 49-143654[U]

[52] U.S. Cl. ............................. 180/8 A; 280/5.22
[51] Int. Cl.² ........................................ B62B 5/02
[58] Field of Search ............... 280/5.22, 5.24, 5.32, 280/47.2, 47.32; 180/9.22, 19 R, 8 A

[56] References Cited

UNITED STATES PATENTS

| | | | |
|---|---|---|---|
| 3,092,200 | 6/1963 | Chambers | 280/5.22 X |
| 3,195,919 | 7/1965 | Lossman | 280/47.32 X |
| 3,512,658 | 5/1970 | Harlan | 180/9.22 X |
| 3,713,501 | 1/1973 | Hurt | 280/5.22 X |
| 3,810,662 | 5/1974 | Commanda | 280/47.32 X |

Primary Examiner—Joseph F. Peters, Jr.
Assistant Examiner—John A. Pekar
Attorney, Agent, or Firm—Martin A. Farber

[57] ABSTRACT

A stairway climbing cart for lifting goods along the stairway which may also be moved on the floor. The cart has a driving crawler belt at the central portion thereof for facilitating the turning of the cart at the stage of the stairway and has a pair of wheels and sledge members at both sides of the cart. The wheels are to move on the floor and the sledge members are to prevent the lateral overthrow of the cart.

6 Claims, 5 Drawing Figures

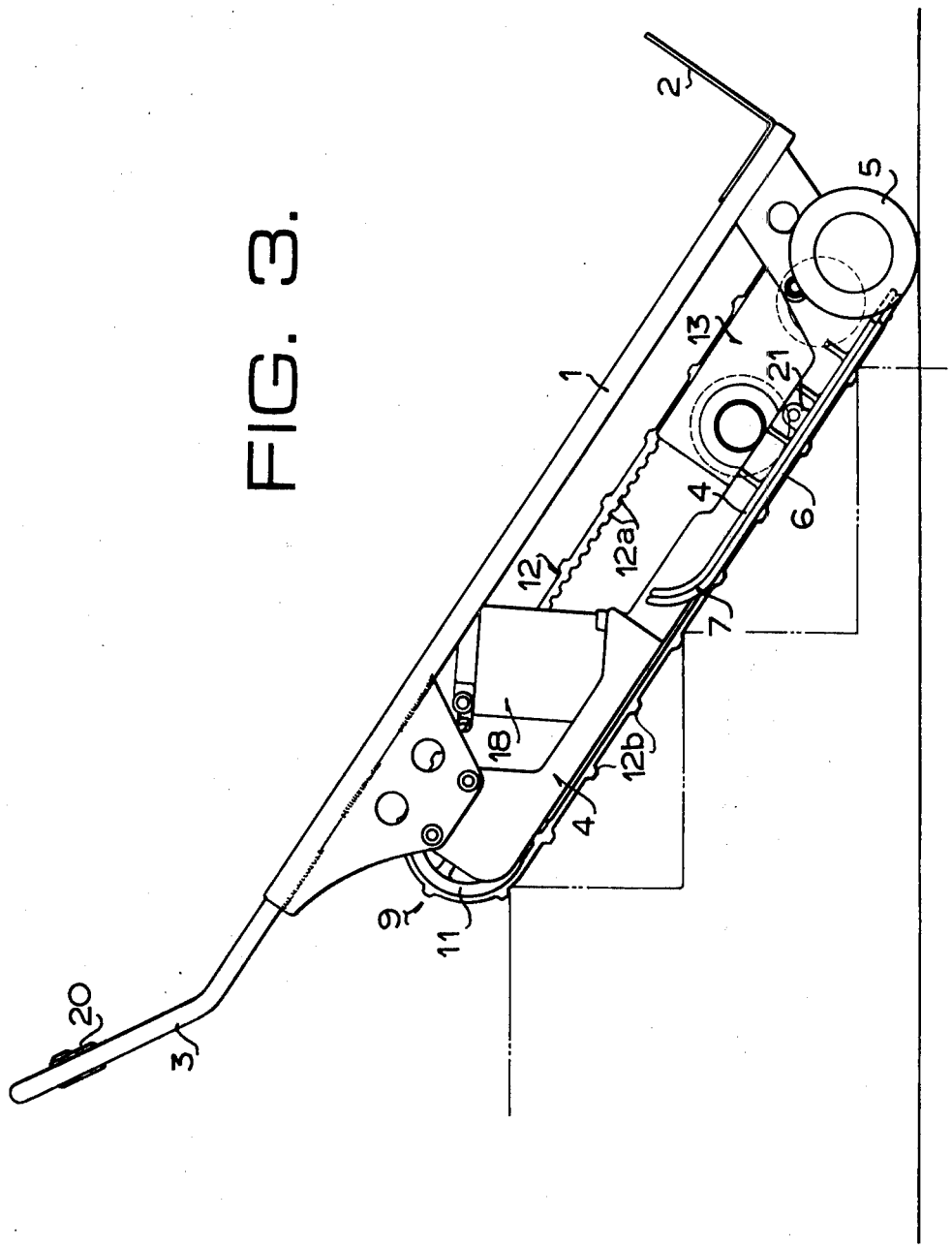

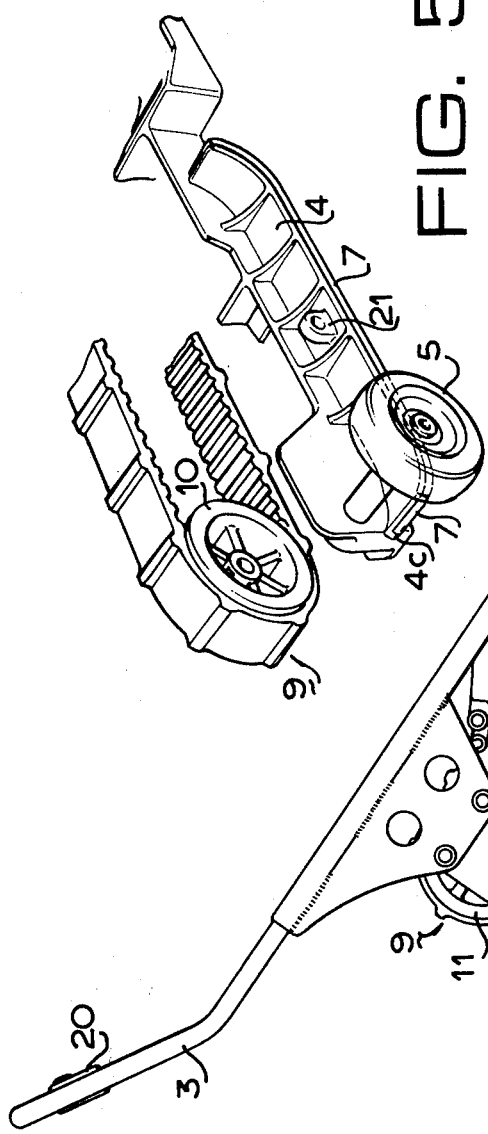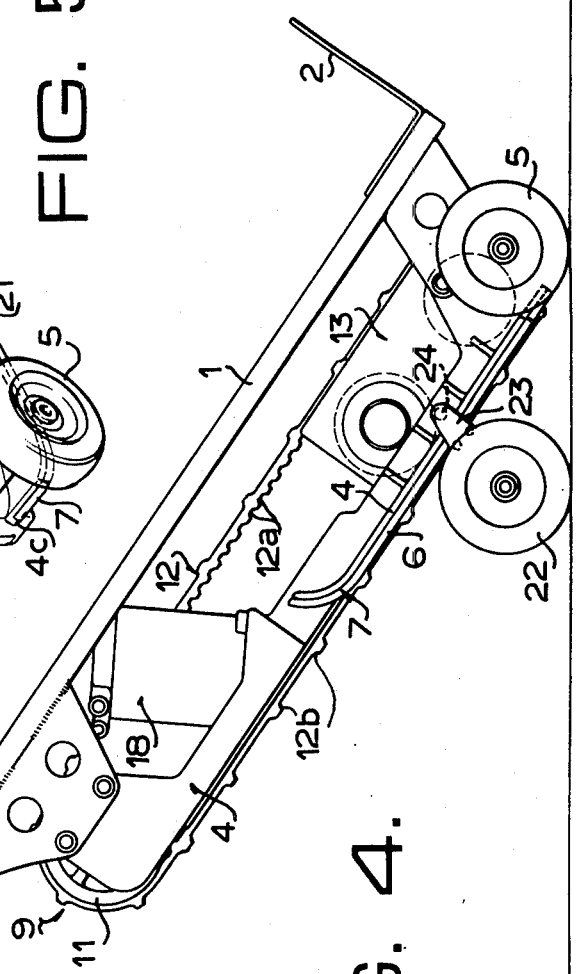

STAIRWAY-CLIMBING CART

The present invention relates to a power-driven cart which can be moved on the flat road or floor and which can ascend the stairs for carrying lifting goods.

There has been provided a stairway climbing cart which has a pair of crawler belts on opposite sides of the frame of the cart. Each crawler belt is connected to the power unit through the clutch device in order to enable a change of the travel direction of the cart. When the travel direction is changed on the stage of the stairway, either of the clutches must be disengaged. Accordingly the conventional cart must have a complicated and heavy transmission device and the handling of the clutch devices requires a skilled operator and especially it is difficult to operate the cart on a spiral stairway.

An object of the present invention is to provide a stairway climbing power-driven cart which may ascend on the stairway without the controlling operation of the transmission device and which is easily operable on the special type of stairway such as a spiral stairway.

Another object of the present invention is to provide a stairway climbing cart which can also be moved on the floor with wheels.

Other objects and advantages of the present invention will be apparent from the following description with reference to the accompanying drawings, in which:

FIG. 3 is a side view of the cart in the climbing state;

FIG. 4 is a side view of the cart showing the travelling state on the floor; and FIG. 5 is a perspective view showing a part of another embodiment of the present invention.

Figure 1:
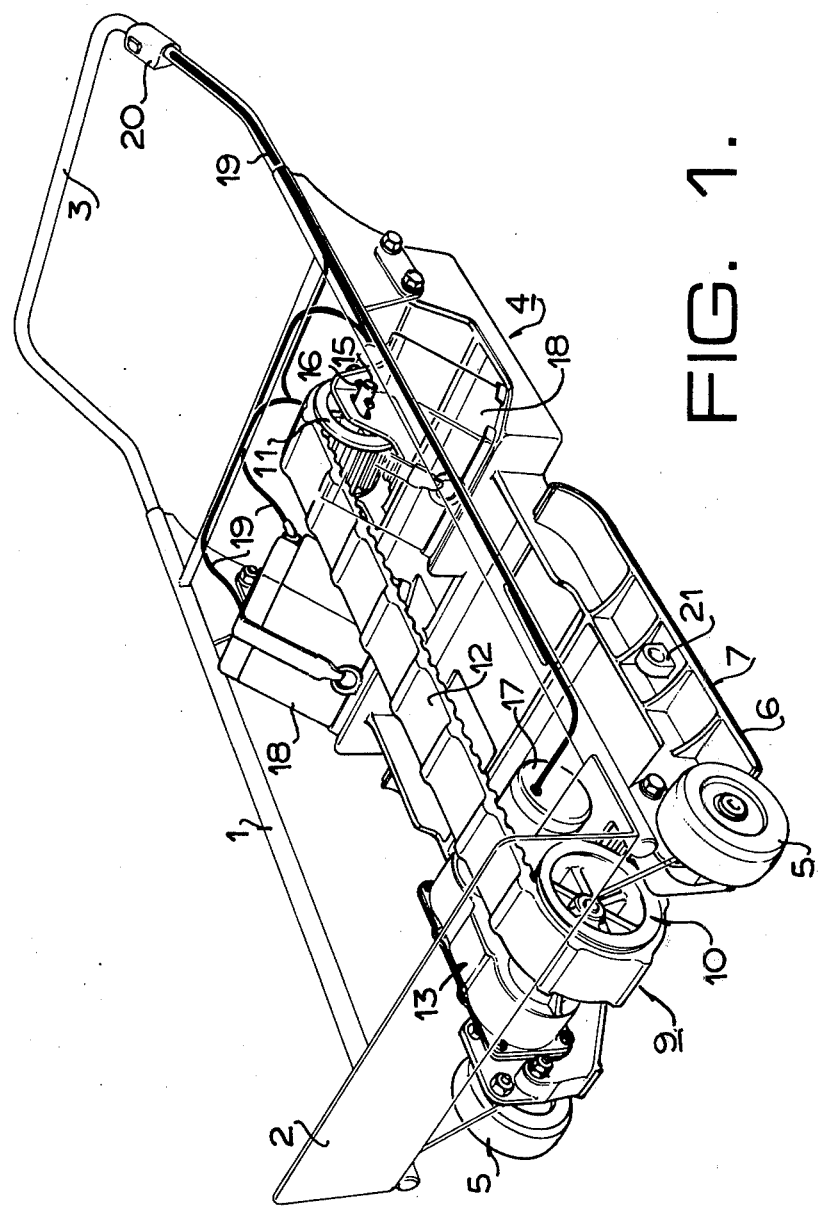
FIG. 1 is a perspective view showing a stairway climbing cart according to the present invention.
Figure 2:
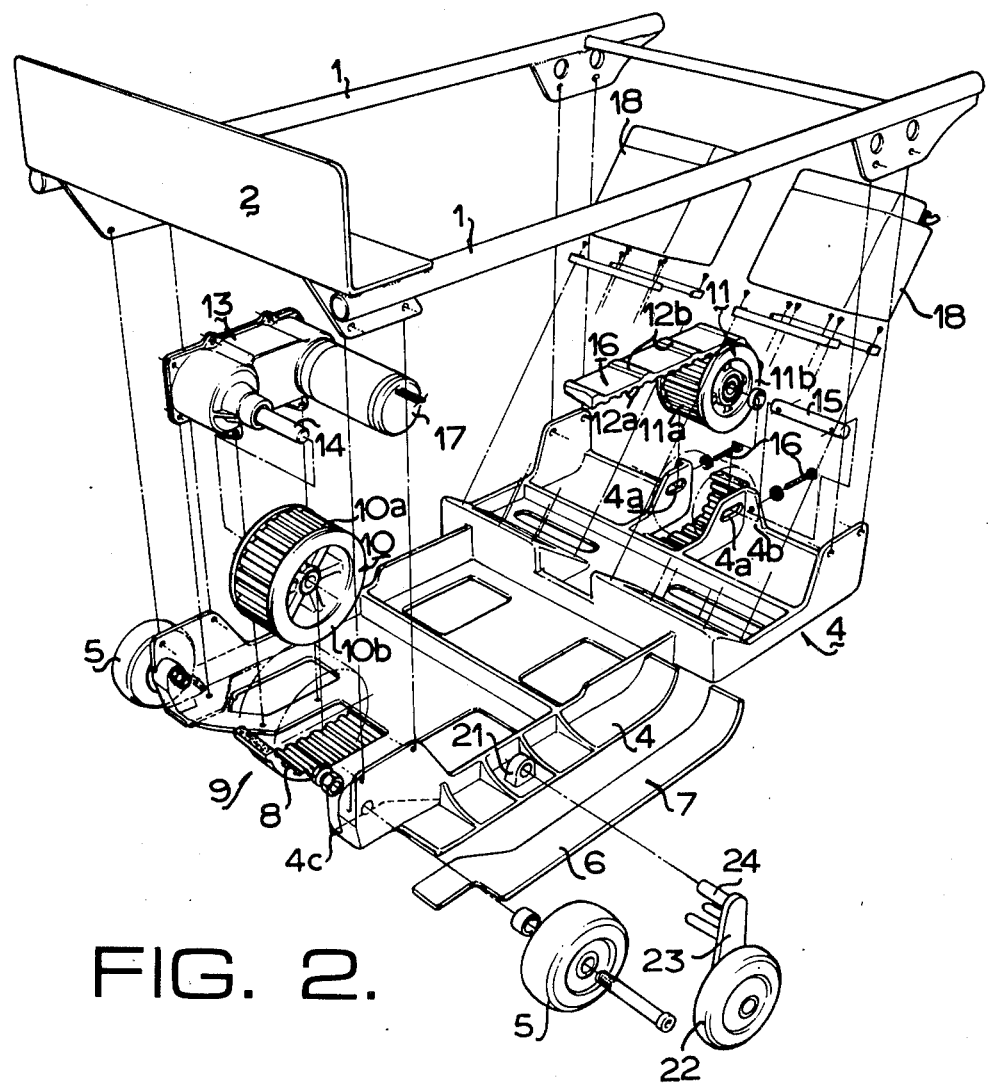
FIG. 2 is a perspective view of the cart disassembled in parts.

Referring now to the drawings, the cart according to the present invention comprises a carrier frame 1 of pipes, a goods receiving plate 2 mounted on the front end of the frame 1, a loop handle 3 secured to the rear end of the frame 1, and a body 4 secured to the underside of the frame 1. A pair of wheels 5 are rotatably provided in the front portion of the body 4 by shafts. Adjacent to the wheels, a pair of sledge members 7 (of which each slipping surface 6 thereof is positioned at the same level as the tread of the wheels) are secured to the body 4. A driving belt crawler 9 is disposed in the central portion of the carrier frame 1 such that the crawling surface is positioned at a slight lower level than that the slipping surface 6 of the sledge member 7 and the front end of the crawler is positioned at a position rearwardly retracted from the wheel 5. In addition, the belt crawler 9 has a length spanning at least two steps of the stairway. The belt crawler comprises toothed wheels 10 and 11 journaled at the front and rear portions of the body 4 and a rubber endless belt 12 engaged with the toothed wheels 10 and 11. The wheels 10 and 11 have gear teeth 10a and 11a which are engaged with teeth 12a of the endless belt 12 respectively. Further, the wheels 10 and 11 have flanges 10b and 11b respectively to prevent the deflection of the belt. The endless belt 12 has a plurality of protrusions 12b formed on the outside surface thereof and engageable with the edge of each stop.

The wheel 10 is connected with a transmission shaft 14 of a geared reducer 13 and the wheel 11 is rotatably supported on the shaft 15 of which both ends are engaged with elongated slots 4a and 4a. Each end of the shaft 15 is connected to the end of each bolt 16 which is screwed in the threaded hole formed in the bracket 4b of the body 4. thus, rotation of each bolt 16 causes the shaft to slide along the elongated slot 4a to tension the belt 12.

A motor 17 connected to the reducer 13 for driving the cast and batteries 18 are mounted on the body 4. A manual switch 20 is provided on the handle 3 and connected to the motor 17 and batteries 18 by wiring 19 for control of the motor.

The sledge memeber 7 is preferably made of plastic or foam rubber and secured to the body 4 abutted on the rib 4c formed on the body to ensure the attachment of the sledge to the body. Further a pair of bearing devices 21 are provided on the both sides of the body. In each bearing device 21, the pin 24 of the arm 23 pivoted on the shaft of the wheel 22 may be rotatably supported in case of necessity.

In operation, when climbing the stairway, the sledge members 7 serve to surpport the cart against a lateral overthrow and the belt crawler 9 acts to ascend the cart on the stairway. The cart is readily ascends in the stable condition without holding the handle 3, because the driving belt crawler has a length spanned between two steps of the stairway. Since the centrally positioned belt crawler 9 only is driven from the motor 17, the operator can easily and smoothly turn the cart on the stage of the stairway without operating clutches. For the same reason, the cart may be ascended on spiral staircases with ease.

When the cart is moved on the floor, the handle 3 is kept at such inclination that the belt crawler 9 is located above the floor and the wheels 5 support the cart on the floor. Thus, the cart may be moved on the floor as usual carts or hand trucks. In this case, if a pair of wheels 22 are attached to the cart at the bearing devices 21 by pins 24, the cart is supported by four wheels. Thus the cart may be easily and safely moved by operator.

In the cart shown in FIG. 5, each wheel 5 is provided to project outwardly from the sledge member 7.

From the foregoing, it will be understood that the present invention may provide a stairway climbing cart which may be easily turned without operating the clutches and which may be easily moved on the floor with wheels.

What is claimed is:
1. A stairway climbing cart comprising
a carrier frame defining sides thereof having front portions,
a pair of front wheels having a tread and disposed in front portions of both sides of said frame,
a pair of sledge members disposed at the sides of said frame substantially laterally extending away from said frame beyond said wheels adjacent said front wheels, respectively, and elongated rearwardly, said sledge members including slipping surface means at a lower surface thereof for slidably contacting steps of a stairway during a climbing operation,
a driving belt crawler disposed in a central portion of said carrier frame and having a driving wheel, a driven wheel and an endless belt operatively engaged with said driving and driven wheels, and having a crawling surface of said endless belt positioned at a slightly lower level than that of said tread of said front wheels, and being rearwardly retracted from said front wheels, and having a length spanning at least two steps of the stairway.

2. The stairway climbing cart in accordance with claim 1, further comprising a pair of wheel assembly means removably attached to both sides of said frame for rolling movement on a floor.

3. The stairway climbing cart in accordance with claim 2, wherein a pair of bodies are secured to an underside of said frame and formed with bearing devices at the sides thereof, respectively, each of said bearing devices including opening means, each of said removable wheel assembly means comprises, a wheel having a shaft, an arm pivoted at one end thereof on said shaft, said arm having at least one pin at its other end, the latter releaseably mountable in said opening means of said bearing device.

4. Stairway climbing cart in accordance with claim 1, wherein said slipping surface means is disposed at the same level as the tread of said front wheels.

5. The stairway climbing cart in accordance with claim 4, further comprising a body secured to the underside of said frame and defining lateral ribs, at sides of the frame, respectively, said sledge members abutting said ribs, respectively, and being secured to said body.

6. The stairway climbing cart in accordance with claim 4, wherein said sledge members have a rearwardly upwardly curved portion.

* * * * *